United States Patent [19]
Bersch et al.

[11] Patent Number: 4,713,519
[45] Date of Patent: Dec. 15, 1987

[54] APPARATUS FOR LASER BEAM WELDING THE LONGITUDINAL EDGES OF A CAN

[75] Inventors: Bernhard Bersch; Heinz Jüttner; Ulrich Tenhaven, all of Dortmund, Fed. Rep. of Germany

[73] Assignee: Hoesch Aktiengesellschaft, Fed. Rep. of Germany

[21] Appl. No.: 915,862

[22] Filed: Oct. 6, 1986

Related U.S. Application Data

[63] Continuation of Ser. No. 767,765, Aug. 21, 1985, abandoned.

[51] Int. Cl.⁴ .................................................. B23K 26/00
[52] U.S. Cl. ........................ 219/121 LC; 219/121 L; 219/64; 219/121 LS
[58] Field of Search ...... 219/121 L, 121 LT, 121 LS, 219/121 LC, 121 LD, 121 EC, 59.1, 60.2, 64, 61.11, 60 A, 61.1

[56] References Cited

U.S. PATENT DOCUMENTS

| | | | |
|---|---|---|---|
| 4,017,708 | 4/1977 | Engel | 219/121 LE |
| 4,152,573 | 5/1979 | Saurin et al. | 219/121 LD |
| 4,187,406 | 2/1980 | Fencl et al. | 219/61.1 |
| 4,224,096 | 9/1980 | Osborne | 219/121 LD |
| 4,354,090 | 10/1982 | Nilsen | 219/121 LD |
| 4,365,136 | 12/1982 | Gottlieb | 219/121 LD |
| 4,497,995 | 2/1985 | Nilsen | 219/121 LC |
| 4,577,088 | 3/1986 | Sharp | 219/64 |

*Primary Examiner*—M. H. Paschall

[57] ABSTRACT

The invention involves the use of laser beam welding for the mass production of welded shells for sheet metal cans. The high requirements as to the precision of the welded seam are obtained through a guide system for exactly guiding pieces to the welding machine and consisting of an X-rail, a guide bar and the spring loaded jaws of a caterpillar tractor. A smooth welded seam is produced on the inner side of the can shell by having the seam welded from the inside of the can shell as well as from the outside by means of a laser beam.

7 Claims, 6 Drawing Figures

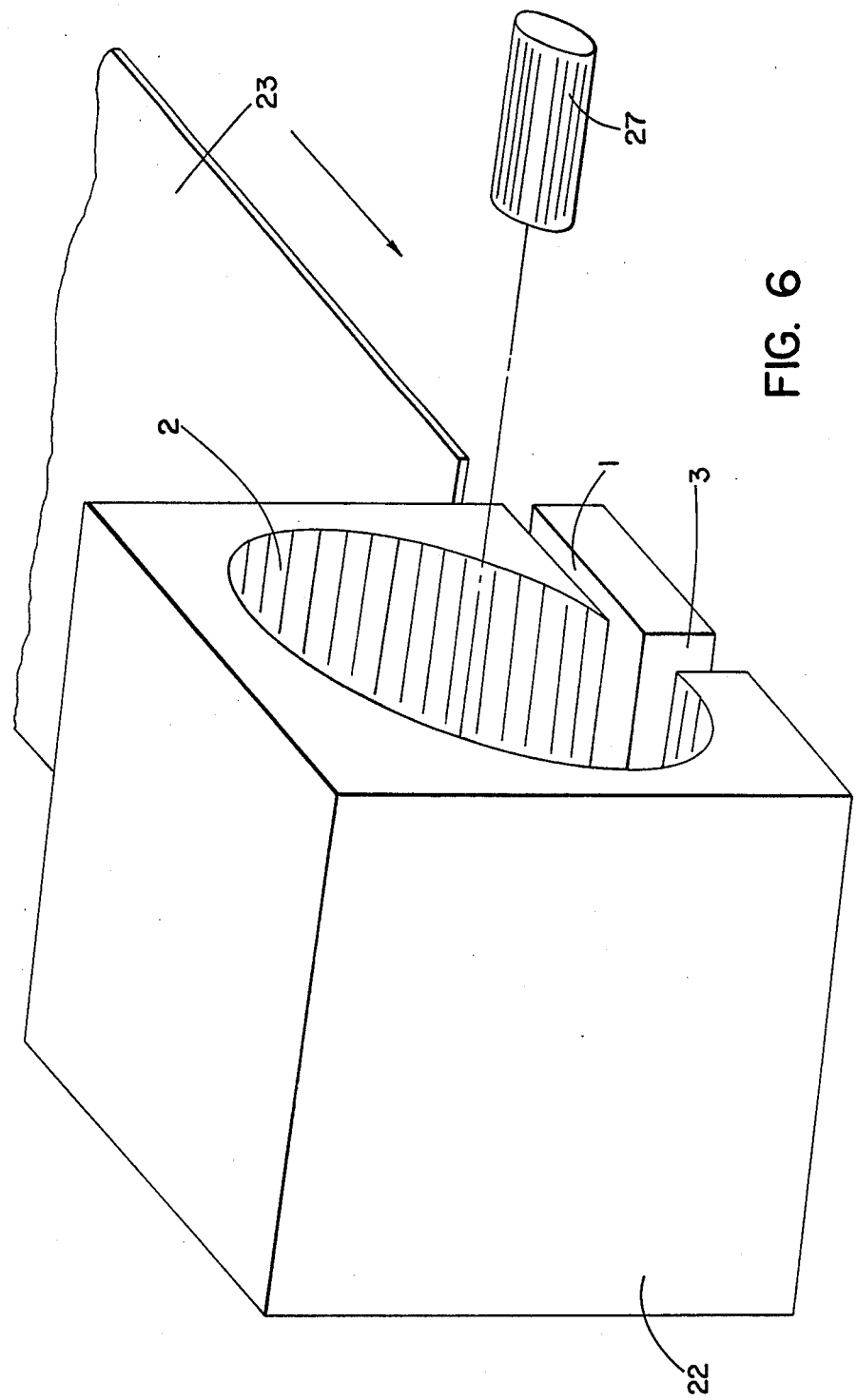

APPARATUS FOR LASER BEAM WELDING THE LONGITUDINAL EDGES OF A CAN

This is a continuation of application Ser. No. 767,765, filed Aug. 21, 1985 and now abandoned.

The invention concerns an apparatus for laser beam welding the edges of a rectangular sheet metal piece bent into a can shell which edges are pushed together into abutting relationship and which sheet metal is made of coated or uncoated steel or aluminum sheet, the apparatus including a sheet bending device, inner and outer precise guides for the bent can shell and for the edges to be welded, a transport means for the can shell and at least one laser beam welding device for welding the edges.

One such device is known from U.S. Pat. No. 4,354,090. The welding seams created by this device are however of such poor quality that the cans are practically unusable. The poor quality is due to the fact that the entire energy of the welding beam is not effective in the process of welding together the edge. A portion of the energy is reflected by the bright cut edges and is therefore lost. The reflected portion is subject to large variations becaue the surfaces of the cut edges due to humidity and temperature or other contaminants take on a thin barely visible oxide layer after the cutting. This oxide layer causes a reflectivity of varying value. A beam adjusted at one time to a good welding effect a short time later meets with a different oxide layer and no longer produces a good welding effect. Welding faults arising in this manner lead in the inside of the can to a sagging weld seam in the case of too strong a beam and to a nonwelded crevasse in the case of a too weak beam.

A crevasse has the disadvantage that upon the application of the protective lacquer the lacquer draws away from the crevasse's sharp edges. The can is therefore insufficiently protected against corrosion. Moreover, the weld seam easily rips open at the crevasse especially if it is flanged in the further working of the shell. A sagging weld seam leads likewise to faults in the lacquer and also represents a strength risk.

The invention has as its object the provision of a laser beam welding method for manufacturing cans by means of which method these disadvantages are avoided and through the use of which the weld seam is uniform throughout the entire thickness and by means of which the advantages of the guide as described in U.S. Pat. No. 4,354,909 for very thin sheet material and for mass production, and for guiding the to-be-welded edges which are pushed into abutting relationship are retained.

These objects are obtained in that in addition to the known laser beam welding device in which the laser beam is directed onto the outer side of the can shell, a second device is provided for applying a second laser beam to the inner side of the can shell, which device produces a beam outside of the guides which beam is directed through the portion of the cross section of the shell not filled by the inner guide or through a hollow space of the inner guide, and in that moreover in the unfilled portion or in the hollow space of the inner guide a mirror and a collecting lens is provided, the inner guide below the spot to be welded having an opening and the mirror and collecting lens being so arranged that the beam is projected through the opening onto the spot to be welded.

The welding from both sides has the advantage that the energy of the laser beam can vary in strength on each side so that it welds between fifty to one hundred percent of the sheet thickness. It is of no disadvantage if the middle zone of the sheet thickness is welded from both sides in an overlapping manner behind one another. The overlapping area allows for variations of the beam welding effect due to different edge reflectivities.

The apparatus is described below with the help of FIGS. 1 to 6 of the drawings.

The drawings are:

FIG. 6 is a view showing the forming station for the can shell.

Figure 1:
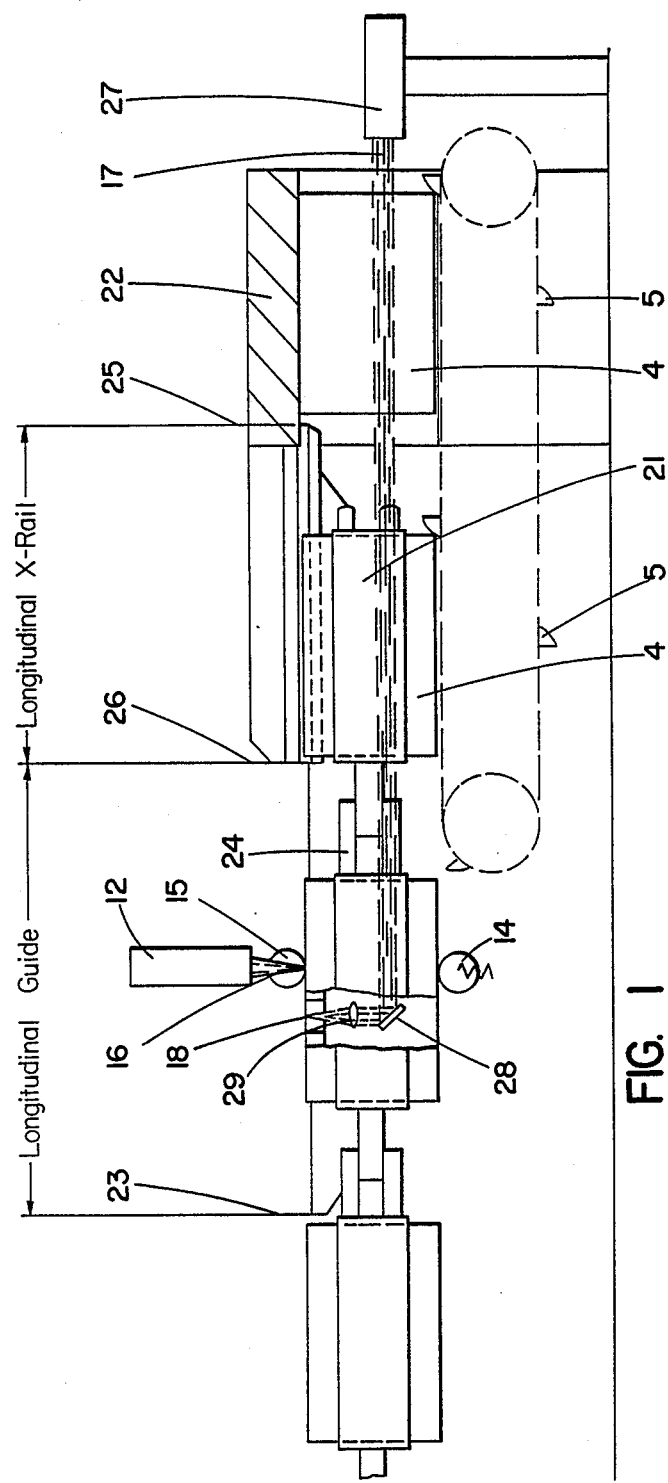
FIGS. 1 and 2 are views showing the device for guiding bent can shells to the welding machine.

The cut pieces of tin 23 are introduced sidewise into the forming station 22, as seen in FIG. 6, through a slot 1 and are bent to a can shell 4 by the cylindrically shaped inner space of the forming station 22. The forming station 22 has in its middle a free cross section 2 extending through it in the longitudinal direction and through which a laser beam from the laser beam source 27 passes. The forming station 22 has a lower slot 3. A driving dog 5 of a transport mechanism extends through this slot and drives the can shell 4 in the direction toward the welding station 12.

Figure 2:
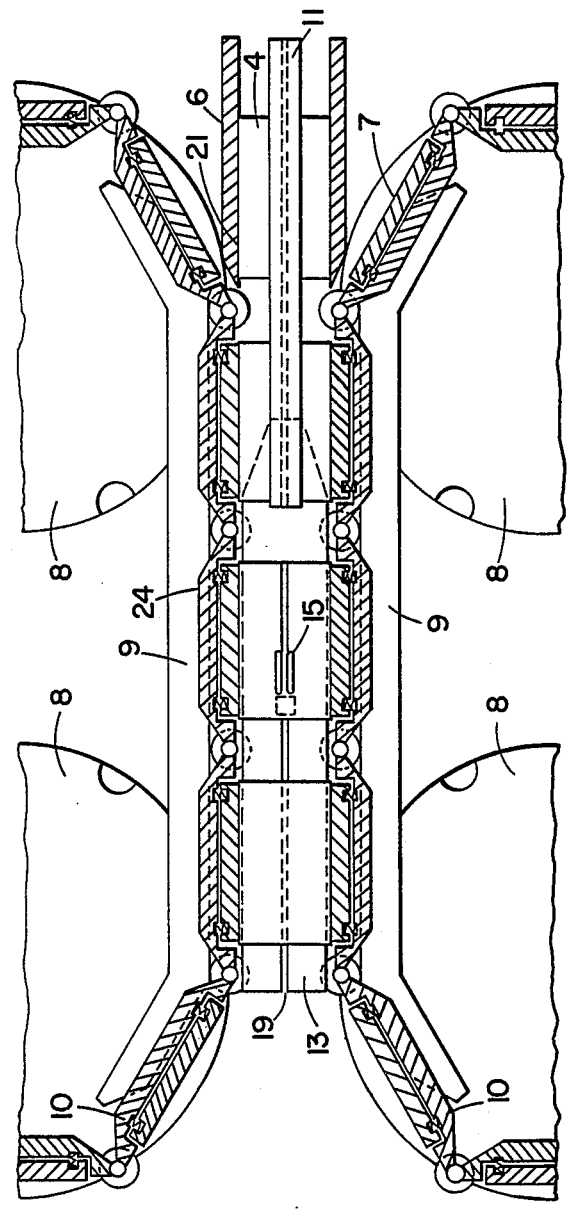
Figure 3:
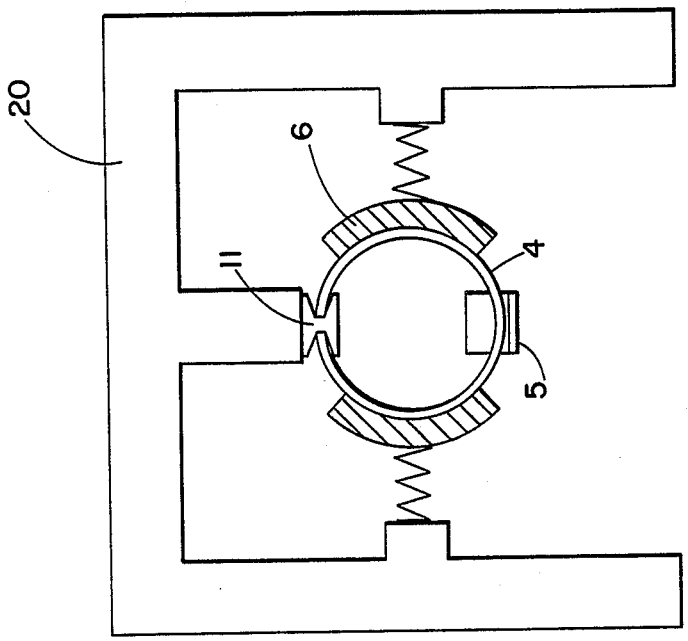
FIG. 3 is a view showing the edges of the sheet in the area between the sheet bending device to shortly before the welding machine.

At a first point along the path from the forming station 22 the can shell 4, as shown in FIG. 3, is outwardly slidably guided between guide pieces 6 while it is moved by the dog 5 in the direction toward the welding station. The end of this section of the path lies at position 21. From this point on the can shell 4 is slidably guided on its inner surface. The conveyor at this point becomes a specially formed caterpillar tractor 24 with spring loaded jaws 7, see FIG. 2. The caterpillar tractor 24 consists of chain wheels 8, guiderails 9, chain members 10 and jaws 7. The cut edges of the can shell 4 are next guided to an X-rail 11 which, as shown in FIG. 1, extends from position 25 to position 26. The X-rail guarantees the exact positioning shortly in advance of the welding station 12 of the edges which are to be welded.

Figure 4:
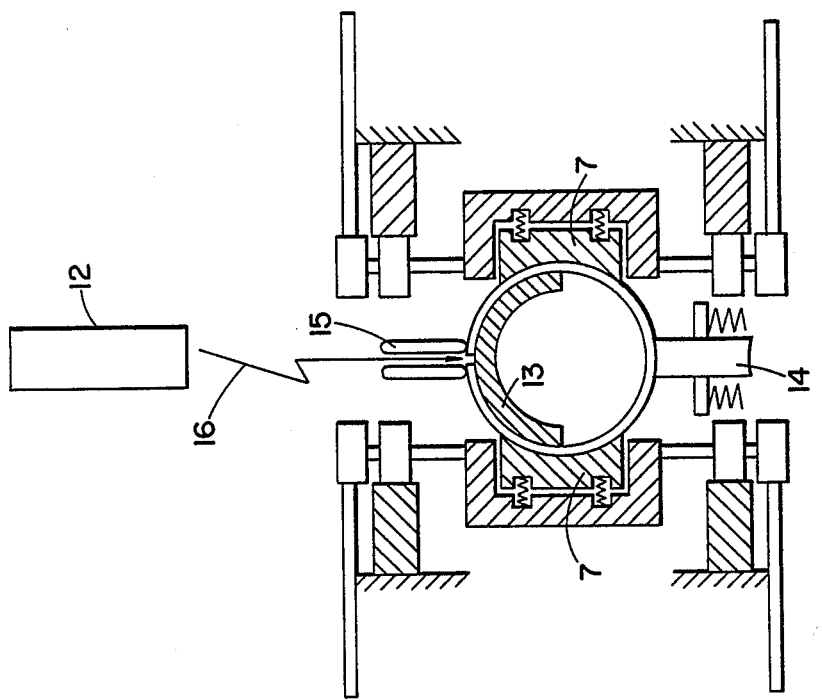
FIG. 4 is a view showing the clamping and guiding of the sheet during the welding.
Figure 5:
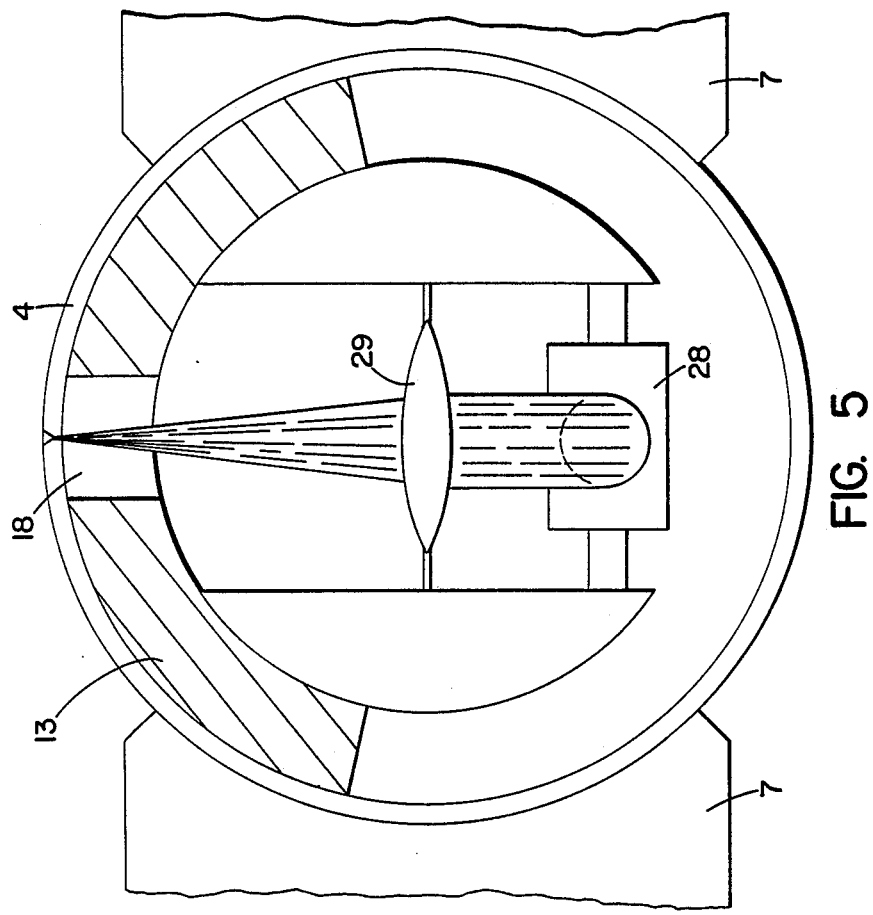
FIG. 5 is a cross section through the can shell at the inner welding location.

The can shell 4 during the welding slides over the inner guide strip 13 and is tensioned by the laterally arranged jaws 7, which work as a pressure applying apparatus, and by a lower pressure roll 14 so that the cut edges are pressed fully against one another and are moved without any air gap through the welding station 12 as shown in FIGS. 4 and 5. To prevent displacement of the edges at the welding point the can shell is pressed against the guide bar 13 at the cut edges by means of double rolls 15. The laser beam 16 which is applied to the can shell from the outside passes exactly midway between the double rolls 15. The laser beam 17 which is applied to the can shell from the inside is displaced from the outside welding point and passes through a window 18 in the guide bar 13.

The guide bar 13 has a groove 19 extending away from the welding window 18 in the vicinity of the body seam for receiving the increased thickness of the seam.

The guide bar 13 is fastened to the forward portion of the X-rail and the X-rail is in turn fastened to a frame 20.

The length of the guide bar 13 extends from position 26 to position 23.

The lower welding beam is produced by a laser source 27, is bent by the mirror 28 and is projected onto the inner surface of the can shell by the concentrating lens 29. The speed of advancement of the transport mechanism, i.e., the driving dogs 5, 5 and associated conveyor belt and the caterpillar tractor 24, and the energy of the laser beams can be adjusted such that on each side of a can shell less than the entire thickness of the sheet material is welded.

It is possible to derive both laser beams from only one laser source with such laser source producing one beam which is divided into two; each of which two beams is then directed to one of the welding points.

What is claimed is:

1. An apparatus for producing welded can bodies from rectangular pieces of sheet material, said apparatus comprising a forming station means having a cylindrically shaped inner space surrounding a given axis and into which space rectangular pieces of sheet material may be successively fed in a direction tangentially of said inner space to bend each piece into a cylindrical shape, said forming station means having a first open end located at one point along said given axis and a second open end spaced downstream along said given axis from said first end, welding means providing a welding station located downstream along said given axis from said forming station, and means for moving each piece of sheet material after it is bent into a cylindrical shape by said forming station means downstream along said given axis from said forming station means to and past said welding station and for guiding such piece of material during such movement, said moving and guiding means being such that said cylindrical shape of each bent piece of material is maintained as it is moved from said forming station means to said welding station and such that the longitudinal edges of the piece are abutted at said welding station, said moving and guiding means further being such that a substantial portion of the inside cross-section of each bent piece of sheet material is empty throughout its passage from said forming station means to said welding station so that an empty path extends parallel to said given axis from a point upstream of said first end of said forming station means to said welding station, said welding means including an outside welding means for directing a first laser welding beam onto the outside of a bent piece of sheet material at said welding station at a first point intersecting the abutting longitudinal edges of said piece to weld said abutting edges to one another as they are moved past said welding station, and an inside welding means for directing a second laser welding beam onto the inside of a bent piece of sheet material at said welding station at a second point intersecting the abutting longitudinal edges of said piece to also weld said abutting edges to one another as they are moved past said welding station, said inside welding means including a means for directing said second laser welding beam so that it passes through said point located upstream of said first open end of said forming station means and from said point travels parallel to said given axis along said empty path to said welding station, a mirror at the downstream end of said empty path for reflecting said second welding beam toward the inside surface of a bent piece of sheet material at said welding station, and a concentrating lens between said mirror and said inside surface of a bent piece of sheet material for concentrating said second beam onto said second point intersecting said abutting longitudinal edges of said bent piece of sheet material, each of said first and second welding beams having such an energy level that each of said beams welds less then the entire thickness of each piece of bent sheet material as such piece is moved past said welding station.

2. An apparatus for producing welded can bodies from rectangular pieces of sheet material as defined in claim 1 further characterized by said first and second points at which said first and second welding beams intersect said abutting longitudinal edges of a bent piece of sheet material being spaced from one another along said given axis.

3. An apparatus for producing welded can bodies from rectangular pieces of sheet material as defined in claim 1 further characterized by said moving and guiding means including a caterpillar tractor conveyor having successive pairs of jaws which move parallel to said given axis from a point upstream to a point downstream of said welding station, each of said pairs of jaws being located on opposite sides of said given axis for engaging the opposite sides of a bent piece of sheet material after it leaves said forming station with the abutting longitudinal edges of such piece located midway between said jaws, said jaws having parti-cylindrical surfaces conforming to the cylindrical shape of each piece of bent sheet material for engaging such pieces.

4. An apparatus for producing welded can bodies from rectangular pieces of sheet material, said apparatus comprising a forming station means having a cylindrically shaped inner space surrounding a given axis and into which space rectangular pieces of sheet material may be successively fed in a direction tangentially of said inner space to bend each piece into a cylindrical shape, and forming station means having a first open end located at one point along said given axis and a second open end spaced downstream along said given axis from said first end, welding means providing a welding station located downstream along said given axis from said forming station, and means for moving each piece of sheet material after it is bent into a cylindrical shape by said forming station means downstream along said given axis from said forming station means to and past said welding station and for guiding such piece of material during such movement, said moving and guiding means being such that said cylindrical shape of each bent piece of material is maintained as it is moved from said forming station means to said welding station and such that the longitudinal edges of the piece are abutted at said welding station, said moving and guiding means further being such that a substantial portion of the inside cross-section of each bent piece of sheet material is empty throughout its passage from said forming station means to said welding station so that an empty path extends parallel to said given axis from a point upstream of said first end of said forming station means to said welding station, said welding means including an outside welding means for directing a first laser welding beam onto the outside of a bent piece of sheet material at said welding station at a first point intersecting the abutting longitudinal edges of said piece to weld said abutting edges to one another as they are moved past said welding station, and an inside welding means for directing a second laser welding beam onto the inside of a bent piece of sheet material at said welding station at a second point intersecting the abutting longitudinal edges of said piece to also weld said abutting edges to one another as they are moved past said welding station, said inside welding means including a means for directing said second laser welding beam so that it passes through said point located upstream of said first open end of said forming station means and from said point travels parallel to said given axis along said empty path to said welding station, a mirror at the downstream end of said empty path for reflecting said second welding beam toward the inside surface of a bent piece of sheet material at said welding station, and a concentrating lens between said mirror and said inside surface of a bent piece of sheet material for concentrating said second beam onto said second point intersecting said abutting longitudinal edges of said bent piece of sheet material, said moving and guiding means including a stationary inside guide located at said welding station and extending both upstream and downstream from said welding station, said inside guide having a guide surface which engages the inside surface of a bent piece of sheet material as such piece is moved past said welding station, said inside guide surface extending considerably less than the full circumference of the inside of a piece of bent sheet material and being arranged so as to engage the ftwo longitudinal edge portions of a piece of bent sheet material which are adjacent to the abutting longitudinal edges of such piece, said guide having an opening therethrough to allow said second welding beam to pass through it into engagement with a piece of bent sheet material at said welding station.

5. An apparatus for producing welded can bodies from rectangular pieces of sheet material as defined in claim 4 further characterized by said guide means including two rolls located externally of a bent piece of sheet material at said welding station, said rolls being arranged so as to be on opposite sides of the seam defined by the abutting longitudinal edges of a bent piece of sheet material at said welding station with each roll engaging an associated one of the two longitudinal edge portions of such bent piece of sheet material at a point which is backed up by said guide surface of said inside guide to press said longitudinal edge portions into engagement with said guide surface and to hold said longitudinal edges in abutting relationship.

6. An apparatus for producing welded can bodies from rectangular pieces of sheet material as defined in claim 5 further characterized by means directing said first laser welding beam between said two rolls onto said first welding point so that said first welding point is at least approximately on the straight line connecting the two points at which said two rolls engage a bent piece of sheet material.

7. An apparatus for producing welded can bodies from rectangular pieces of sheet material, said apparatus comprising a forming station means having a cylindrically shaped inner space surrounding a given axis and into which space rectangular pieces of sheet material may be successively fed in a direction tangentially of said inner space to bend each piece into a cylindrical shape, said forming station means having a first open end located at one point along said given axis and a second open end spaced downstream along said given axis from said first end, welding means providing a welding station located downstream along said given axis from said forming station, and means for moving each piece of sheet material after it is bent into a cylindrical shape by said forming station means downstream along said given axis from said forming station means to and past said welding station and for guiding such piece of material during such movement, said moving and guiding means being such that said cylindrical shape of each bent piece of material is maintained as it is moved from said forming station means to said welding station and such that the longitudinal edges of the piece are abutted at said welding station, said moving and guiding means further being such that a substantial portion of the inside cross-section of each bent piece of sheet material is empty throughout its passage from said forming station means to said welding station so that an empty path extends parallel to said given axis from a point upstream of said first end of said forming station means to said welding station, said welding means including an outside welding means for directing a first laser welding beam onto the outside of a bent piece of sheet material at said welding station at a first point intersecting the abutting longitudinal edges of said piece to weld said abutting edges to one another as they are moved past said welding station, and an inside welding means for directing a second laser welding beam onto the inside of a bent piece of sheet material at said welding station at a second point intersecting the abutting longitudinal edges of said piece to also weld said abutting edges to one another as they are moved past said welding station, said inside welding means including a means for directing said second laser welding beam so that it passes through said point located upstream of said first open end of said forming station means and from said point travels parallel to said given axis along said empty path to said welding station, a mirror at the downstream end of said empty path for reflecting said second welding beam toward the inside surface of a bent piece of sheet material at said welding station, and a concentrating lens between said mirror and said inside surface of a bent piece of sheet material for concentrating said second beam onto said second point intersecting said abutting longitudinal edges of said bent piece of sheet material, said moving and guiding means including a caterpillar tractor conveyor having successive pairs of jaws, which move parallel to said given axis from a point upstream to a point downstream of said welding station, each of said pairs of jaws being located on opposite sides of said given axis for engaging the opposite sides of a bent piece of sheet material after it leaves said forming station with the abutting longitudinal edges of such piece located midway between said jaws, said jaws having parti-cylindrical surfaces conforming to the cylindrical shape of each piece of bent sheet material for engaging such pieces, a stationary inside guide located at said welding station and extending both upstream and downstream from said welding station, said inside guide having a guide surface which engages the inside surface of a bent piece of sheet material as such piece is moved past said welding station, said inside guide surface extending considerably less than the full circumference of the inside of a piece of bent sheet material and being arranged so as to engage the two longitudinal edge portions of a piece of bent sheet material which are adjacent to the abutting longitudinal edges of such piece, said guide having an opening therethrough to allow said second welding beam to pass through it into engagement with a piece of bent sheet material of said welding station, and two rolls located externally of a bent piece of sheet material at said welding station, said rolls being arranged so as to be on opposite sides of the seam defined by the abutting longitudinal edges of a bent piece of sheet material at said welding station with each roll engaging an associated one of the two longitudinal edge portions of such bent piece of sheet material so that said first welding point is at least approximately on the straight line connecting the two points at which said two rolls engage a bent piece of sheet material to press said longitudinal edge portions into engagement with said guide surface of said inside guide and to hold said longitudinal edges in abutting relationship.

* * * * *